(12) United States Patent
Bourqui et al.

(10) Patent No.: US 8,494,699 B2
(45) Date of Patent: Jul. 23, 2013

(54) REDUNDANT HARDWARE ARCHITECTURE FOR THE CONTROL SIGNALS STAGE OF SYSTEM FOR BRAKING A VEHICLE ALL OF WHOSE WHEELS ARE EACH LINKED TO AT LEAST ONE ROTARY ELECTRIC MACHINE

(75) Inventors: Gérald Bourqui, Villars-sur-Glane (CH); Fabrice Cudre-Mauroux, Noreaz (CH); Jean-Louis Linda, La Tour-de-Treme (CH)

(73) Assignees: Compagnie Generale des Etablissements Michelin, Clermont-Ferrand (FR); Michelin Recherche et Technique, S.A., Granges-Paccot (CH)

( * ) Notice: Subject to any disclaimer, the term of this patent is extended or adjusted under 35 U.S.C. 154(b) by 169 days.

(21) Appl. No.: 12/674,707

(22) PCT Filed: Sep. 19, 2008

(86) PCT No.: PCT/EP2008/062579
§ 371 (c)(1),
(2), (4) Date: Jun. 28, 2010

(87) PCT Pub. No.: WO2009/037352
PCT Pub. Date: Mar. 26, 2009

(65) Prior Publication Data
US 2011/0046830 A1    Feb. 24, 2011

(30) Foreign Application Priority Data
Sep. 20, 2007  (FR) ..................... 07 06595

(51) Int. Cl.
*B60T 8/171*   (2006.01)
*B60L 7/02*    (2006.01)

(52) U.S. Cl.
USPC .......................... 701/22; 701/76; 303/122.04

(58) Field of Classification Search
USPC ......................... 701/22, 76; 303/122.04, 152
See application file for complete search history.

(56) References Cited

U.S. PATENT DOCUMENTS

| 5,343,971 A | * | 9/1994 | Heidelberg et al. ...... 180/65.245 |
| 5,345,154 A | | 9/1994 | King ............................ 318/49 |

(Continued)

FOREIGN PATENT DOCUMENTS

| DE | 19937159 A1 | * | 2/2001 |
| EP | 0 878 332 A1 | | 11/1998 |

(Continued)

OTHER PUBLICATIONS

EPO machine translation of WO 2007-107576 A1.*

(Continued)

*Primary Examiner* — James Trammell
*Assistant Examiner* — David Testardi
(74) *Attorney, Agent, or Firm* — Fitzpatrick, Cella, Harper & Scinto (57) ABSTRACT

System for electrical braking of a road vehicle of which at least one wheel is linked in rotation to at least one rotary electric machine, at least one wheel drive electronic module 23 driving the electric machine or machines of one and the same wheel, comprising a central unit 3 ensuring the management of the movement of the vehicle, the said central unit controlling the wheel drive electronic module or modules 23, comprising a braking control at the disposal of a driver, the said control being linked mechanically at least to three sensors C1, C2, C3 delivering a control signal for braking the vehicle having a given amplitude representative of the total braking force desired for the vehicle, the said sensors C1, C2, C3 being distributed into a first group C1 and a second group C2, C3, in which the sensor (sensors) C1 of the first group delivers (deliver) its (their) control signal to the said central unit 3 and the sensor (sensors) of the second group C2, C3 delivers (deliver) its (their) control signal to the or to each of the wheel drive electronic modules 23.

13 Claims, 5 Drawing Sheets

U.S. PATENT DOCUMENTS

| | | | | |
|---|---|---|---|---|
| 5,418,437 A * | 5/1995 | Couture et al. | | 318/139 |
| 5,481,460 A | 1/1996 | Masaki et al. | | 364/424.07 |
| 5,549,172 A * | 8/1996 | Mutoh et al. | | 180/65.1 |
| 5,810,454 A * | 9/1998 | Prinzler et al. | | 303/20 |
| 5,954,407 A * | 9/1999 | Schramm et al. | | 303/155 |
| 5,961,190 A * | 10/1999 | Brandmeier et al. | | 303/152 |
| 6,081,081 A | 6/2000 | Maisch | | 318/139 |
| 6,113,119 A | 9/2000 | Laurent et al. | | 280/124.1 |
| 6,157,887 A * | 12/2000 | Zittlau | | 701/70 |
| 6,244,675 B1 | 6/2001 | Behrends et al. | | |
| 6,299,261 B1 * | 10/2001 | Weiberle et al. | | 303/20 |
| 6,317,675 B1 * | 11/2001 | Stolzl et al. | | 701/76 |
| 6,345,225 B1 * | 2/2002 | Bohm et al. | | 701/70 |
| 6,476,515 B1 | 11/2002 | Yamamoto et al. | | |
| 6,657,356 B2 | 12/2003 | Laurent et al. | | 310/254 |
| 6,685,281 B2 | 2/2004 | MacGregor et al. | | 303/123 |
| 6,756,710 B2 | 6/2004 | Bourqui et al. | | 310/44 |
| 6,880,654 B2 | 4/2005 | Plishner | | 180/65.6 |
| 6,909,200 B2 | 6/2005 | Bouchon | | 307/10.1 |
| 7,023,224 B2 * | 4/2006 | Ansari et al. | | 324/691 |
| 7,096,098 B2 | 8/2006 | Auguet et al. | | 701/22 |
| 7,096,985 B2 | 8/2006 | Charaudeau et al. | | 180/65.2 |
| 7,359,786 B2 * | 4/2008 | Lindqvist | | 701/70 |
| 7,439,711 B2 | 10/2008 | Bolton | | 320/166 |
| 7,848,857 B2 | 12/2010 | Nasr et al. | | 701/22 |
| 2005/0225165 A1 * | 10/2005 | Naik et al. | | 303/20 |
| 2009/0234525 A1 * | 9/2009 | Bourqui et al. | | 701/22 |
| 2009/0256415 A1 | 10/2009 | Bourqui et al. | | 303/3 |
| 2009/0272608 A1 | 11/2009 | Bourqui et al. | | 188/160 |
| 2010/0065386 A1 | 3/2010 | Bourqui | | 188/159 |
| 2010/0256887 A1 | 10/2010 | Linda et al. | | 701/82 |

FOREIGN PATENT DOCUMENTS

| | | |
|---|---|---|
| EP | 1 026 060 A2 | 8/2000 |
| EP | 1541437 A2 * | 6/2005 |
| FR | 2 776 966 A1 | 10/1999 |
| FR | 2 850 071 A1 | 7/2004 |
| WO | WO 03/065546 A2 | 8/2003 |
| WO | 2005110829 A1 | 11/2005 |
| WO | WO 2007107576 A1 * | 9/2007 |

OTHER PUBLICATIONS

French Priority Application FR 0706595 (filed: Sep. 20, 2007; date of receipt at International Bureau in compliance with Rule 17.1(a) or (b): Oct. 21, 2008).*

Certified English Translation of French Priority Application FR 0706595 (filing date: Sep. 20, 2007; translation date: Feb. 1, 2013).*

* cited by examiner

REDUNDANT HARDWARE ARCHITECTURE FOR THE CONTROL SIGNALS STAGE OF SYSTEM FOR BRAKING A VEHICLE ALL OF WHOSE WHEELS ARE EACH LINKED TO AT LEAST ONE ROTARY ELECTRIC MACHINE

FIELD OF THE INVENTION

The present invention relates to road vehicles. It relates in particular to systems for braking an electric-traction road vehicle.

BACKGROUND

Electric vehicles encompass vehicles in which the electrical energy necessary for their movement is stored in batteries and vehicles in which the electrical energy is produced on board, by an engine driving a generator or by a fuel cell. The traction of the vehicle is ensured by one or more electric machines. The braking of the vehicle is ensured by a conventional mechanical braking system. The prior art already contains very numerous electric-traction vehicle proposals. It is possible to cite for example U.S. Pat. No. 5,418,437 which describes a four-wheel vehicle, of series hybrid type, each wheel being driven by an electric machine specific to it, a controller making it possible to drive the wheel motors and ensuring the management of energy provision to the motors from an alternator or battery. This patent remains silent on the management of the electrical braking.

However, an electric machine being reversible, it can also be used as an electrical generator during the vehicle braking phases and in this case it transforms the mechanical braking energy into electrical energy that the vehicle must absorb, optionally by thermal dissipation. This mode of operation is often called "electrical braking" or "recovery braking".

In practice, electric machines operate as generators to ensure moderate deceleration of the vehicle, to recover, as far as it is possible, the energy and store it in electrical accumulators, or even to dissipate it so as to lessen the degree to which the mechanical brakes of the vehicle are invoked. The main braking of a vehicle is in fact ensured by hydraulically controlled mechanical brakes, in general in an assisted manner, and now usually provided with an anti-lock function commonly denoted "ABS". Braking is a paramount safety function on a vehicle. Mechanical brakes are of considerable power, capable of locking the wheel, power clipping being ensured by the anti-lock function, the clipping being related to the limit of grip. To ensure the safety of passengers, the braking system of a passenger vehicle is in general capable of ensuring a deceleration of the order of 1 "g", g being the unit of acceleration for which the value "1" corresponds to terrestrial gravity.

Additionally, in an electric-traction vehicle, a particularly beneficial configuration is produced by integrating the electric machine into the wheel since this does away with mechanical shafts and offers more latitude for the general architecture of the vehicle. The prior art contains several arrangements for integrating electric machines into the wheels. Patent application WO 2003/065546 proposes to deploy four electric machines transmitting their torque to the wheel by means of an epicyclic train. Patent application EP 0878332 discloses a ground linkage which integrates at one and the same time the vertical suspension of the wheel inside the latter and a rotary electric-traction machine. There is a reduction stage between the wheel and the electric machine, the latter being meshed with a toothed wheel coaxial with the wheel. Of course the wheel comprises a disc brake so as to ensure the service braking function. Furthermore, the ground linkage comprises a pivot so as to make it possible to deflect the wheel. All the mechanical functions of a ground linkage are thus integrated into the wheel.

Operational safety being paramount, numerous traditional mechanical brake control systems have been proposed, such as for example that of patent application EP 1 026 060 which describes redundant means, driving by majority decision, several low-voltage power supplies of the control systems for maintaining total operability even if several batteries have failed. Let us also cite U.S. Pat. No. 6,244,675 describing a braking control whose position is measured by three sensors, supplied by two independent sources: one sensor is supplied by a first source, another by a second source, and the third by both sources via diodes; if one of the sources is out of service, two sensors are still supplied and remain in service.

It is also possible to cite U.S. Pat. No. 6,476,515 which shows a use of four sensors, measuring different physical quantities. The sensors are grouped as a function of the physical principle measured and they are all necessary for the normal calculation of the braking force.

The invention pertains to electrical braking systems of a road vehicle equipped with wheels which are linked in rotation each to at least one rotary electric machine, each rotary electric machine cooperating with a single wheel. In such an architecture, it is possible to accord the electrical braking a predominant role, both as regards power and control of the stability of the vehicle (functions known by the terms ABS and ESP) since it is possible to selectively control the wheel torque on each of the wheels via the driving of the rotary electric machine (machines) associated therewith. Again for this purpose the electrical braking must be extremely reliable.

The objective of the present invention is to improve the safety of the electrical braking systems for electric-traction vehicles. In particular, the objective is to propose an architecture of an electrical braking system such that it is possible to dispense with mechanical brakes and ensure the service braking function purely electrically. More specifically, the objective of the present invention is, through particular configurations of redundant means, to make such a system extremely safe in the detection and utilization of a braking request by the driver of a vehicle.

BRIEF DESCRIPTION OF THE INVENTION

Described below is a braking system in which may be distinguished:
  a power stage in which the electrical power necessary for traction and the electrical power generated by the electrical braking circulates,
  a low-voltage electrical power supply stage for supplying electronic command and control circuits for the power elements, and
  a stage for circulating the vehicle braking control signals.

Proposed below is an architecture in which each of these stages comprises a certain level of redundancy. The redundancies proposed for each of the stages can each be used alone, or in combination with another. Of course, the safety level is raised by aggregating all the proposed redundancies.

The invention proposes a system for electrical braking of a road vehicle of which at least one wheel is linked in rotation to at least one rotary electric machine, at least one wheel drive electronic module driving the electric machine or machines of one and the same wheel, comprising a central unit ensuring the management of the movement of the vehicle, the said central unit controlling the wheel drive electronic module or modules, comprising a braking control at the disposal of a driver, the said control being linked mechanically to three sensors delivering a control signal for braking the vehicle having a given amplitude representative of the total braking force desired for the vehicle, the said sensors being distributed into a first group and a second group, in which the sensor (sensors) of the first group is (are) connected physically to the central unit (3) and delivers (deliver) its (their) analogue control signal to the said central unit and the sensor (sensors) of the second group delivers (deliver) its (their) analogue control signal to the or to each of the wheel drive electronic modules, the said wheel drive electronic modules delivering the information originating from the sensors of the second group to the central unit via a communication pathway of computer-based type.

Preferably, the system according to the invention comprising at least two sub-systems each comprising at least one wheel drive electronic module, comprising a low-voltage electrical power supply stage for supplying electronic command and control circuits for the power elements, the said low-voltage electrical power supply stage comprising a first power supply and at least one second power supply, the first power supply and the second power supply being interconnected by an electrical line comprising a first portion and a second portion, the said first and second portions being linked by an electrical separation device for the two portions, capable of interrupting the interconnection on command, in the event of an under-voltage or surge on one of them, one of the sub-systems being supplied by the first portion and the other of the sub-systems being supplied by the second portion, the first group comprising a first sensor connected directly or indirectly to one of the first or second power supplies or both, the second group comprising a second sensor and a third sensor, the second sensor and the wheel drive electronic module or modules of one of the sub-systems being connected directly or indirectly to the first power supply, the second sensor being associated to deliver a control signal to the wheel drive electronic module (modules) of the said sub-system, the third sensor and the wheel drive electronic module or modules of the other of the sub-systems being connected directly or indirectly to the second power supply, the third sensor being associated to deliver a control signal to the wheel drive electronic module (modules) of the said sub-system.

Furthermore, at the level of the power stage, several rotary electric machines are used, at least two and preferably one per drive wheel, thereby already affording some redundancy. Preferably, the system according to the invention comprises at least one electronic dissipation module for each of the sub-systems, one of the electronic dissipation modules being supplied by the first portion and the other of the electronic dissipation modules being supplied by the second portion. The dissipation installation comprises for example an electrical dissipation resistor associated with each of the electronic dissipation modules, so as to always offer some deceleration capability in the event of fault with a resistor or its control module.

In an implementation for a four-wheel vehicle, preferably, each of the wheels is mechanically linked to its or to its own rotary electric machine or machines, each of the said sub-systems comprising two of the said wheels. Preferably, each sub-system groups together the vehicle's wheels disposed diagonally at the opposite corners of the vehicle. It will be seen that this solution offers greater safety than the dual hydraulic braking circuits commonly used on automobiles.

Additionally, very advantageously, the low-voltage electrical power supply stage for supplying electronic command and control circuits for the power elements comprises two independent voltage sources. The said low-voltage electrical power supply stage comprises a first power supply and at least one second power supply, the first power supply and the second power supply being interconnected by a low-voltage electrical line comprising a first portion and a second portion, the said first and second portions being linked by an electrical separation device for the two portions, capable of interrupting the interconnection on command, in the event of under-voltage on one of them, each wheel drive electronic module and electronic dissipation module of one of the sub-systems being supplied by the first portion and each wheel drive electronic module and electronic dissipation module of the other of the sub-systems being supplied by the second portion.

The first power supply consists for example of a voltage converter wired up to the central electrical line. The electrical energy on this central line can originate either from a main source, such as for example a fuel cell, or from an electrical energy storage device, or from the braking energy reused in real-time. A redundancy of the energy sources is therefore also deployed. The second power supply consists for example of a low-voltage battery, dedicated to this low-voltage electrical power supply. Of course, it is possible to use for this second voltage source a second voltage converter wired up likewise to the central line or else directly to the storage bank.

Finally, the stage for circulating the vehicle braking control signals is constructed around three sensors linked mechanically, and preferably separately, to a braking control at the disposal of a driver, the sensors being utilized in a totally different manner as explained subsequently.

Let us point out further that, preferably, to keep the vehicle stationary, a mechanical brake device, commonly called a parking brake, is installed. However, such a device is not designed to brake the vehicle but only to keep it stopped, preferably even on very considerable slopes. Thus, the system according to the invention comprises, associated with one wheel at least, a mechanical wheel braking device controlled solely by a parking brake control. Preferably, the parking brake device is controlled by an electric actuator driven by a braking control unit which can be activated only below a longitudinal speed threshold of the vehicle, the said threshold being for example less than 10 km/h.

BRIEF DESCRIPTION OF THE FIGURES

Other objectives and advantages of the invention will become clearly apparent in the description which follows of a preferred but nonlimiting embodiment, illustrated by the following figures in which.

DESCRIPTION OF THE BEST EMBODIMENT OF THE INVENTION

Figure 1:
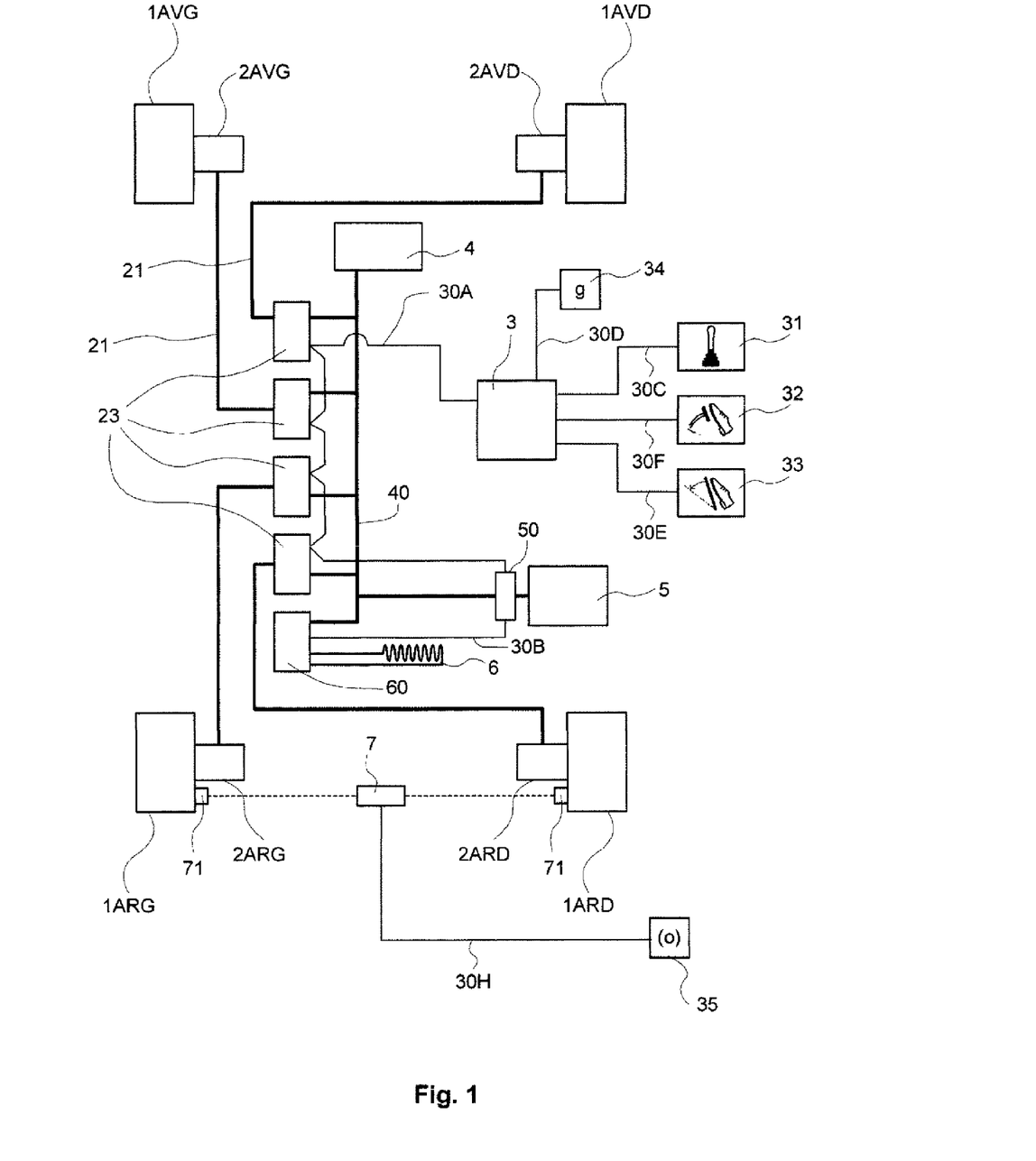
FIG. 1 schematically represents a system for braking a four-wheel vehicle, with onboard electrical energy production.

Shown diagrammatically in FIG. 1 is a vehicle with four wheels $1_{AvG}$, $1_{AvD}$, $1_{ArG}$ and $1_{ArD}$. The wheels are denoted $1_{AvG}$ for the front left wheel, $1_{AvD}$ for the front right wheel, $1_{ArG}$ for the rear left wheel and $1_{ArD}$ for the rear right wheel. Each wheel is equipped with an electric machine which is coupled to it mechanically. The electric machines $2_{AvG}$, $2_{AvD}$, $2_{ArG}$ and $2_{ArD}$ are depicted. Hereinafter, the indices specifically denoting the position of the wheel 1 or of the electric machine 2 in the vehicle will not be repeated when this adds nothing to the clarity of the account. The electric-traction machines 2 are three-phase synchronous machines, equipped with an angular position sensor of resolver type and are driven by the wheel drive electronic modules 23 to which they are linked by electrical power lines 21. The wheel drive electronic modules 23 are designed to drive the electric machines in terms of torque. Each wheel drive electronic module 23 makes it possible to selectively impose a drive torque that is determined in terms of amplitude and sign on the wheel considered. Therefore, the electric machines can be used as motors and as generators. Each of the rear wheels $1_{ArG}$ and $1_{ArD}$ is equipped furthermore with a mechanical wheel braking device 71 controlled by an electric actuator 7 driven by a braking control unit.

In a particularly advantageous implementation of the invention, none of the wheels of the vehicle comprises a mechanical service brake. Whatever the amplitude of the braking control signal, that is to say even for the most intense brakings, the braking is ensured solely electrically, that is to say by driving the electric machines as generators. Each wheel comprises one or more dedicated electric machines so as to be able to generate a braking force selectively on each wheel, which it would not be possible to do with an electric machine common to several wheels, for example the wheels of an axle, since in this case there would be a mechanical transmission and a differential between the wheels. The electric machines are dimensioned in an appropriate manner for imposing the highest possible braking force on each wheel.

Of course, the system comprises means capable of absorbing a high electrical power, which for example leads to the installation of one or more effectively cooled, for example by water circulation, electrical dissipation resistors, the known electrical accumulators not being capable of absorbing the electrical power produced by emergency braking or not being capable of absorbing the whole of the electrical energy produced by long-duration braking, except by installing a capacitor such that the weight of the vehicle would be truly prohibitive. Thus, the invention makes it possible to form an autonomous electrical system isolated from the environment, without exchanging electrical energy with the exterior of the vehicle, therefore applicable also to motor vehicles, a much more difficult application of electrical braking systems than in the case of vehicles linked to an electrical network such as urban trams or trains.

Numerous arrangements are possible for designing an electric machine coupled mechanically to the wheel. Let us note however that it will be of advantage to install a fairly large geardown, for example at least equal to 10 and even preferably greater than 15, so that the electric machine is not too bulky. It is possible to install an electric machine in a manner coaxial with the wheel, the mechanical link being ensured by an epicyclic gear train so as to obtain the necessary geardown. It is also possible to adopt a configuration of the kind of that described in patent application EP 0878332, preferably by adding a mechanical geardown stage. It is also possible to choose to deploy several electric machines whose torques are compounded. In this case, an electronic wheel module can drive several electric machines in parallel installed in one and the same wheel. Patent application WO 2003/065546 and patent application FR 2776966 may for example be consulted regarding the issue of installing several electric machines in a wheel.

The invention is illustrated in an application to a vehicle ensuring onboard electrical energy production. Depicted is a fuel cell 4 delivering an electrical current on a central electrical line 40. Of course, any other electrical energy supply means can be used, such as for example batteries. An electrical energy storage device is also seen constituted in this example by a bank of super capacitors 5, linked to the central electrical line 40 by an electronic recovery module 50. Depicted is an electrical dissipation resistor 6, preferably immersed in a heat-carrying liquid discharging the heat to an exchanger (not represented), constituting an energy absorption device able to absorb the electrical energy produced by the set of electric machines during braking. The dissipation resistor 6 is linked to the central electrical line 40 by an electronic dissipation module 60.

A central unit 3 manages various functions, including the electric traction chain of the vehicle. The central unit 3 dialogues with the set of wheel drive electronic modules 23 as well as with the electronic recovery module 50 via the electrical lines 30A (CAN Bus®). The central unit 3 also dialogues with an acceleration control 33 via an electrical line 30E, with a braking control 32 (service brakes) via an electrical line 30F, and with a control 31 selecting forward or reverse via an electrical line 30C. This makes it possible to take the driver's intentions into account. The central unit 3 also dialogues with a longitudinal acceleration sensor 34 via an electrical line 30D. Finally, the electronic recovery module 50 dialogues with the electronic dissipation module 60 via an electrical line 30B.

The central unit 3 ensures the management of the longitudinal movement of the vehicle. The said central unit 3 controls the set of electronic wheel drive modules 23. The central unit 3 has a mode of operation for braking the vehicle activated by a control signal for braking the vehicle having a given amplitude representative of the total braking force desired for the said vehicle. In braking mode, whatever the amplitude of the braking control signal, the said central unit 3 controls the set of wheel drive electronic modules 23 in such a way that the sum of the longitudinal loads of the set of wheels 1 originating from the rotary electric machines is a function of the said amplitude of the braking control signal. Stated otherwise, there is no mechanical service brake; the electrical braking system described here is the vehicle's service brake.

Also depicted is a parking brake control 35. The actuator 7 of the mechanical wheel braking device is controlled via an electrical line 30H solely by this parking brake control 35, and absolutely not by the braking control 32. Preferably, to avoid any deterioration of the mechanical braking devices 71 designed solely to keep the vehicle stationary and whose capacity to discharge heat is therefore very limited, the said brake control parking unit can be activated only below a fairly low vehicle longitudinal speed threshold, for example less than 10 km/h.

Let us explain the operation of the system according to the invention.

When the driver selects forward with the aid of the control 31 and actuates the acceleration pedal 33, the central unit 3 orders the wheel drive electronic modules 23 to supply the electric machines 2 by drawing the electrical energy on the central electrical line 40. The latter is supplied by the fuel cell 4 and/or the bank of super capacitors 5, according to the latter's state of charge and under the control of the central unit 3. The vehicle moves forward. The electric machines 2 transform the electrical energy into mechanical traction energy. The power implemented depends in particular on the position of the acceleration control 33.

When the driver actuates the brake pedal 32, the central unit 3 passes to braking mode. On the basis of the driver's action on the brake pedal 32, the central unit 3 calculates a value of the braking control signal. Whatever the amplitude of the braking control signal, the said central unit 3 controls the set of wheel drive electronic modules 23 in such a way that the sum of the longitudinal loads of the set of wheels 1 is proportional to the said amplitude of the braking control signal. The rotary electric machines 2 then transform mechanical energy of rotation into electrical energy.

According to the strategy for managing the electrical energy programmed into the electronic recovery module 50, the latter distributes the braking energy so as to recharge the bank of super capacitors 5 and/or controls the electronic dissipation module 60 in such a way as to dissipate the energy in the electrical dissipation resistor 6. It is clearly understood that when the storage means such as the bank of super capacitors 5 are saturated, all of the energy must be dissipated. Moreover, the power of the storage means may be limited, that is to say the charging rate of the storage means may for example correspond to a light braking as is commonly expected on the part of an engine (what is called the "engine brake"). Beyond this braking level, the electrical power produced is then directed to the dissipation means.

In order to ensure the operational safety of the vehicle, the electrical dissipation resistor 6 is dimensioned and cooled in such a way that all the electrical energy produced in emergency braking manoeuvres, which are the most violent, can be dissipated. In fact, it is appropriate to dimension the chain consisting of the rotary electric machines 2, the wheel drive electronic modules 23, the central electrical line 40, the electronic dissipation module 60 and the electrical dissipation resistor 6 according to criteria of the same severity as is applied to mechanical braking systems.

Preferably, the set of electrical dissipation resistors 6 forms an energy absorption device of power greater than 500 kW per tonne of vehicle. Specifically, if F is the force applied to the vehicle to brake it, if its mass equals M kg and its speed equals V m/sec and if γ is the acceleration in m/sec2, we have $F=M*\gamma$ and $P=F*V=M*(\gamma*V)$; by setting the maximum deceleration equal to 1 g, at 130 km/h, the power per tonne of vehicle equals about 350 kW and it equals about 500 kW at 160 km/h. The person skilled in the art will readily dimension the power of the energy absorption device as a function of the characteristics of the vehicle that he wishes to construct.

Thus, as in the example illustrating the invention, there are two sub-systems each having an electrical dissipation resistor, the power of each of these electrical dissipation resistors 6A and 6B being greater than 250*M/1000 kW.

When the driver selects reverse, the central unit 3 orders the wheel drive electronic modules 23 to invert the operation of the rotary electric machines 2, including in the event of braking.

Let us now describe how it is possible to install a wheel anti-lock function.

The electric-traction machines 2 being equipped with an angular position sensor of resolver type, each wheel 1 having its own rotary electric machine 2, a sensor of rotation speed of each wheel is thus available. It is therefore possible to advantageously equip the system according to the invention with a slippage control device for each wheel in which, in braking mode (or even as soon as the driver lifts his foot off the accelerator pedal to bring about what may suitably be called an engine brake), the drive torque of a wheel is decreased when the slippage control device detects slippage of the wheel considered. It is for example possible to analyse in real time the signal that the rotation speed sensor of each wheel delivers and to deduce the onset of lock from a large variation (deceleration). It is possible to calculate in real time the derivative of the rotation speed signal of each wheel, to thus obtain a signal representative of the acceleration/deceleration of each wheel and to compare the latter with a signal giving the real acceleration/deceleration of the vehicle if an appropriate sensor is available. Such is the longitudinal acceleration sensor 34 already introduced above, or it is the fact of processing several signals making it possible to estimate the real acceleration/deceleration of the vehicle. Henceforth, the central unit 3 can order the wheel drive electronic modules 23 to decrease the wheel drive torque (selectively per wheel) when the slippage control device detects slippage of the wheel considered. Note that this decrease in torque can be managed directly by the wheel drive electronic modules which can react in real time with respect to the speed and acceleration measured on the wheel, the central unit transmitting for example limit speed and acceleration setpoints to be complied with.

In conclusion, let us point out that the absence of any conventional braking member (see disc and caliper in application EP 0878332) substantially simplifies not only the architecture of the vehicle equipped with a system according to the invention, but also its servicing by eliminating the periodic operations of replacing the pads and discs. Among the advantages of dispensing with the conventional hydraulic braking members may furthermore be cited the elimination of any residual friction of the pads (it is known that such friction consumes a not-inconsiderable share of the energy necessary for the operation of a vehicle with conventional braking). The dispensing with the thermal constraints induced on the ground linkage by the conventional hydraulic braking members and the eliminating of nuisance related to the dust produced by the wearing of the pads and discs may also be cited as an advantage.

Described above is a traction system for motor vehicle in which none of the wheels is equipped with mechanical brakes. The vehicle's deceleration capability originates from the driving of rotary electric machines as generators and the latter are dimensioned so as to be able to lock each of the wheels of the vehicle, that is to say they are capable of providing a sufficiently sizeable braking torque.

The subsequent description illustrates a particular, nonlimiting, example making it possible to construct a system exhibiting sufficient hardware redundancy to be able to ensure a very high safety level for the vehicle braking system.

Figure 2:
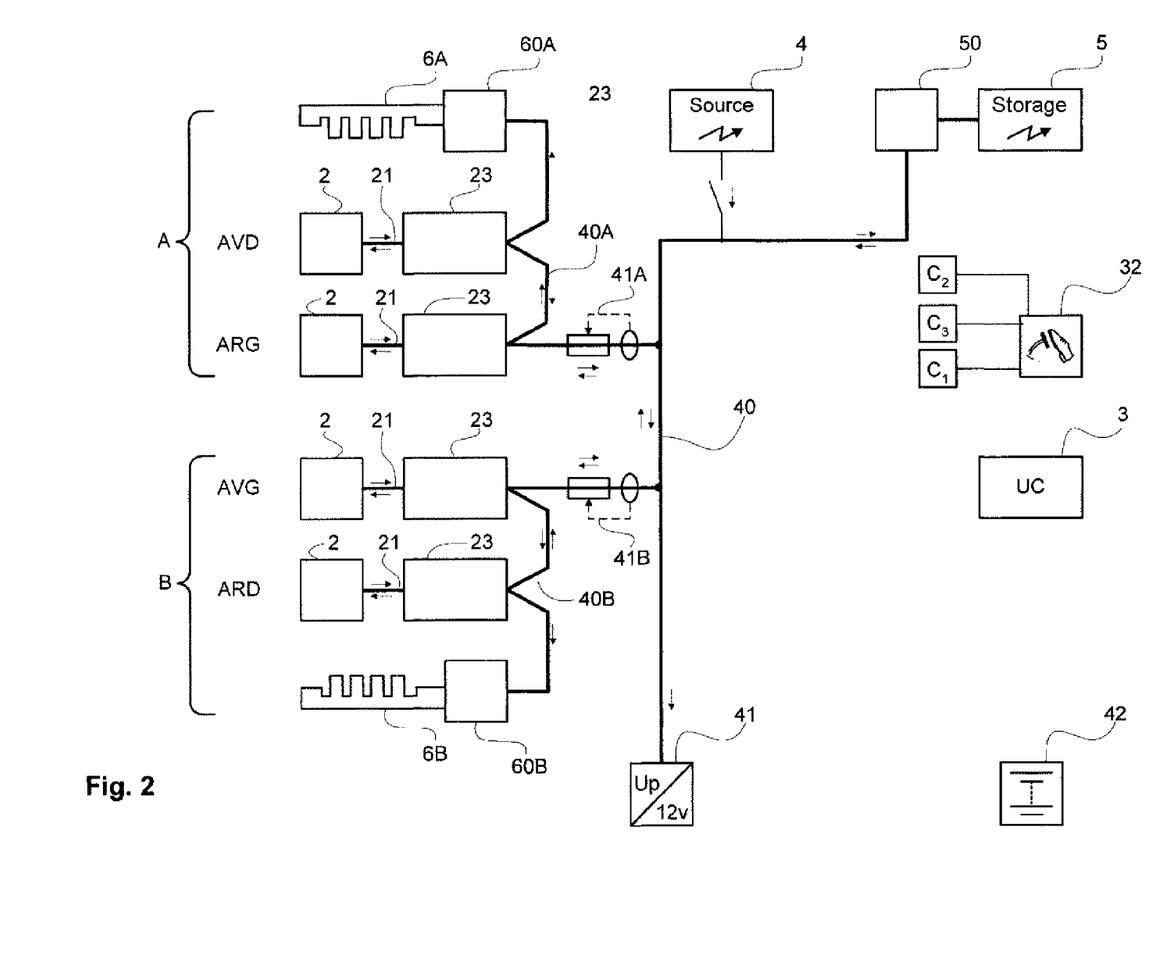
FIG. 2 is a diagram detailing the power level organized to exhibit a certain hardware redundancy.

It is seen in FIG. 2 that the electrical braking system comprises two sub-systems (A and B) connected to the central electrical line 40, each of the sub-systems comprises two wheels each linked in rotation to at least one rotary electric machine 2 specific to it. The front right wheel and the rear left wheel, or more exactly the rotary electric machines 2 and the wheel drive electronic modules 23 associated with them, form the sub-system A. The front left wheel and the rear right wheel, or more exactly the rotary electric machines 2 and the wheel drive electronic modules 23 associated with them, form the sub-system B. Each sub-system comprises an electrical dissipation resistor 6A, respectively 6B, each supplied by an electronic dissipation module 60A, respectively 60B.

If the various constituent elements of the traction system are examined in regard to the hardware redundancy criterion, the rotary electric machines 2 integrated into the wheels form a system which exhibits a redundancy naturally since each of the wheels has its own electric machine. The control electronics of these machines, namely the wheel drive electronic modules 23, also form a system which exhibits a hardware redundancy since each of these electric machines 2 has its own control electronics.

Under recuperative braking, each of the rotary electric machines 2 provides electrical energy on the electrical power line 40 via the wheel drive electronic modules 23. This energy can be is stored in accumulators like the bank of super capacitors 5 or be dissipated by the electrical power resistors 6A and 6B. Under emergency braking, it is obvious that it is not possible to rely on the storage capacity of the accumulators since the latter could very well already be at their maximum charge and incapable of absorbing electrical energy. Henceforth, the electrical resistor 6 is a crucial member for operational safety. Likewise, the electrical power line 40 is a crucial element for the operational safety of the system for braking the vehicle wholly electrically. Various failure scenarios will be examined below.

FIG. 2 shows the main electrical energy source which, in this exemplary embodiment, is a fuel cell 4. Also depicted is the battery of accumulators making it possible to store electrical energy which, in this exemplary embodiment, is a bank of super capacitors 5 and its electronic recovery module 50. Finally, the low-voltage electrical power supply of the various electronic modules is ensured on the one hand by a voltage converter 41 making it possible to convert the voltage available on the electrical power line 40 into low-voltage (for example 12 volts) used to supply the various electronic control circuits, and on the other hand by a battery 42 such as a battery conventionally used on a vehicle with a dc voltage of 12 volts.

It has been seen that, in order to ensure braking safety, the braking system is organized into two sub-systems, namely the system A grouping together the front right wheel and the rear left wheel and the system B grouping together the front left wheel and the rear right wheel. The sub-system A is wired up to the power line 40 via a surge protection device 41A. The sub-system B is wired up to the power line 40 via a surge protection device 41B. Each of the sub-systems therefore comprises its own dissipation resistor 6A, 6B and each has its own electronic dissipation module 60A, 60B, and is wired up to the power line 40 via a surge protection device 41A, 41B capable of electrically isolating the said sub-system from the central electrical line. On the side opposite from the power line 40, downstream of the device 41A, a portion 40A of electrical power line is connected to the wheel drive electronic module 23 associated with the rear left wheel, to the wheel drive electronic module 23 associated with the front right wheel and finally to the electronic dissipation module 60A associated with the dissipation resistor 6A. Likewise, for the sub-system B.

In the event of a fault on the power line 40 causing a cutoff between the connection points of the surge protection devices 41A and 41B, there are still two mutually independent sub-systems, the systems A and B, each capable of ensuring electrical braking of the vehicle. Each of these sub-systems has its own electrical dissipation resistor. There is therefore a hardware redundancy of the power stage.

The power stage may exhibit faults other than a fault on the power line 40. Let us imagine for example that the portion of the power line 40A ending at the electronic dissipation module 60A is interrupted. In this case, the dissipation resistor 6A is off-circuit. The electrical power produced by the sub-system A under electrical braking can travel through the section of the electrical power line 40A which is not interrupted and, via the surge protection device 41A, go back up on the power line 40 and be trunked, via the power line 40B, to the electrical dissipation resistor 6B. The electrical dissipation resistor 6B therefore becomes common, in this case, to the sub-system A and to the sub-system B.

Even if the dissipation electrical power available is halved, in this precise case, the slowing capacity of the electrical braking system remains considerable, sufficient to ensure emergency braking. Specifically, each of the electrical dissipation resistors 6 is immersed in a hydraulic cooling circuit. In the event of emergency braking, the energy produced by the electrical braking is sufficient to make the cooling fluid boil. Nevertheless, as it is transformed into the vapour phase, the vaporized fluid is immediately replaced with cooling fluid in the liquid phase, which again licks the resistor and the system continues to exhibit a certain capacity to discharge heat. Moreover, the cooling system has a certain thermal inertia. The applicant's experiments have demonstrated that, even in this typical case, the electrical braking system remains much more powerful and effective than a cross hydraulic braking system such as those with which motor vehicles are equipped at the present time.

If the electrical power line 40A is interrupted between the wheel drive electronic module 23 associated with the front right wheel and the wheel drive electronic module 23 associated with the rear left wheel, then in this case the electrical dissipation resistor 6A remains available for the rotary electric machine 2 associated with the front right wheel when it operates as a generator while the electrical dissipation resistor 6B is available for the sub-system B and for the rotary electric machine 2 associated with the rear left wheel, that is to say one of the rotary electric machines 2 of the sub-system A. One 6B of the electrical dissipation resistors will receive a higher electrical power than the other 6A. The manner of operation is not optimal but the configuration is then less penalizing to the vehicle slowing capacity than that set forth in the previous paragraph.

If, for any reason, a fault causes the surge protection device 41A to come on, thus isolating the sub-system A, then here again the vehicle braking capabilities remain maximal since the electrical dissipation resistors are dimensioned so as to be able to ensure, globally, the full deceleration of the vehicle even when the electrical energy accumulator, constituted here by the bank of super capacitors 5, is at its maximum charge. In this case, the situation is not one of failure of the electrical braking system as regards the maximum deceleration capability. Admittedly the situation is not optimal as regards general management since in particular the possibility of recovering energy is lost, but this is not prejudicial to safety.

If any one of the failures which have just been explained for the sub-system A arise with the sub-system B, for symmetry reasons, the safety conditions of the electrical braking remain strictly identical. In conclusion, by organizing the power stage as two independent sub-systems, the system A and the system B, each linked to the central electrical power line 40 of the vehicle by its own surge protection device (devices 41A and 41B) and by equipping each of the sub-systems with its own electrical dissipation resistor, a dual hardware redundancy has been organized such that it is possible to ensure the electrical braking of the vehicle under excellent safety conditions.

Figure 3:
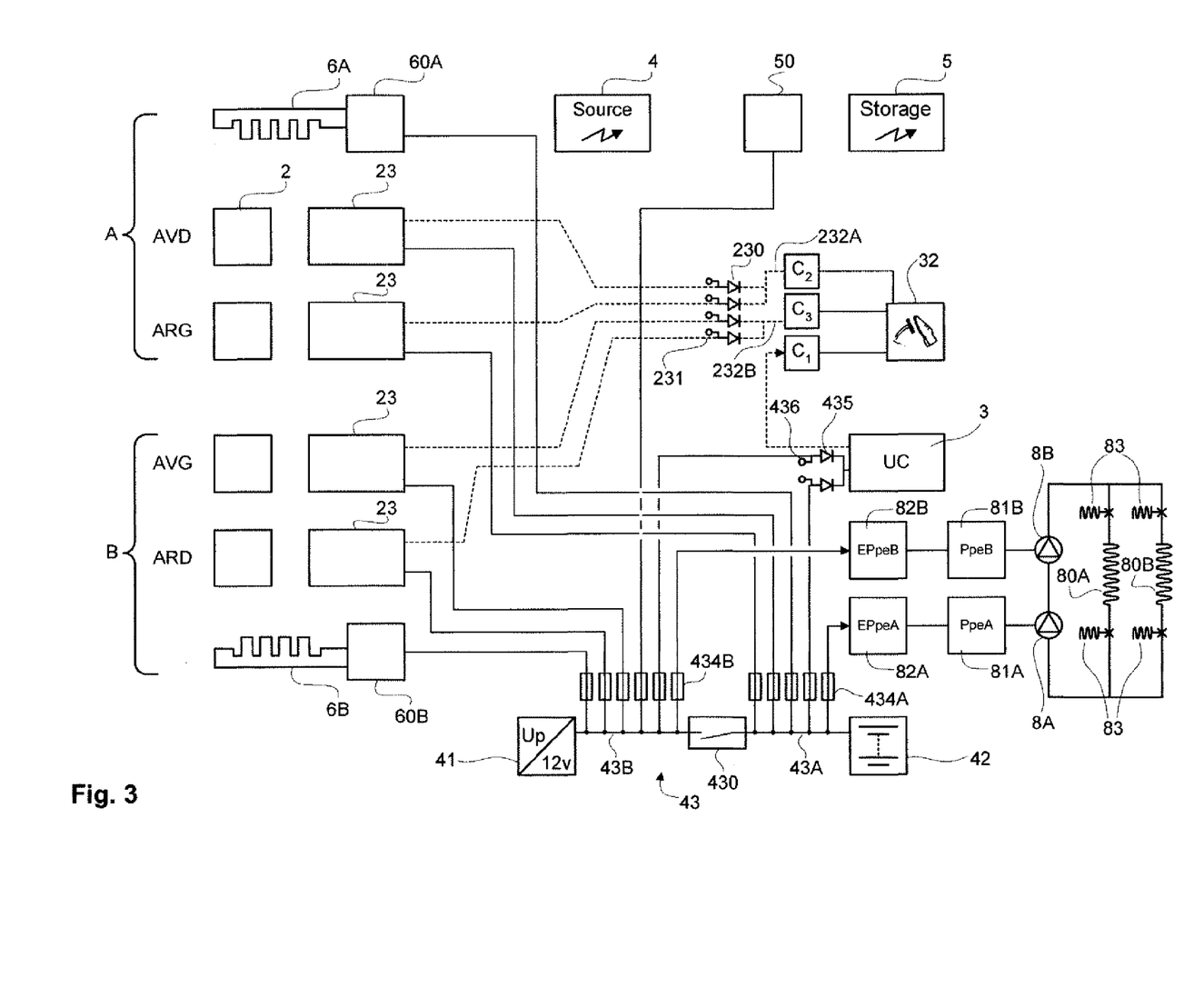
FIG. 3 details the low-voltage electrical power supply level of the various electronic control circuits.

The dissipation power of the electrical dissipation resistors 6A and 6B depends on the proper operation of the cooling system. Specifically, they are immersed in a heat-carrying fluid. FIG. 3 shows the cooling circuit in a schematic manner. It is seen that the latter comprises 2 pumps 8A and 8B and 2 radiators 80A and 80B. The 2 pumps 8A and 8B are mounted in series and each is controlled by its own electric motor 81A and 81B respectively. Each of these electric motors is driven by its own electronic control circuit 82A and 82B. The radiators 80A and 80B are mounted in parallel, and equipped with valves 83 which make it possible to isolate each of the radiators selectively in the event of leakages with one of them. Moreover, the pump/pump actuation motor assembly is dimensioned in such a way that if one of the pumps is faulty, the other pump is capable of ensuring a sufficient flowrate of the heat-carrying fluid despite the fact that the other pump is no longer operational.

The low-voltage electrical power supply of the various electronic control circuits and of the various auxiliaries is now described with the aid of FIG. 3. The latter shows the electronic dissipation modules 60A and 60B of the 2 electrical dissipation resistors 6A and 6B, the wheel drive electronic modules 23 each associated with one of the four electric machines 2, the electronic recovery module 50 associated with the bank of super capacitors 5. Also depicted is the central unit 3, the electronic control circuit 82A for one of the pumps of the cooling circuit and the electronic control circuit 82B for the other of the pumps of the cooling circuit.

The redundancy in respect of the provision of the low-voltage electrical energy is designed in the following manner. Since, on the one hand, there is a voltage converter 41 wired up to the electrical power line 40 and delivering a dc voltage of 12 volts and, on the other hand, there is a battery 42 likewise delivering a dc voltage of 12 volts, certain elements will be wired up to the voltage converter 41 and other elements will be wired up to the 12-volt battery in the following manner. A line 43 ensures the interconnection between the voltage converter 41 and the battery 42. This line 43 comprises a first portion 43A and a second portion 43B, the said first and second portions being linked by an electrical separation device 430 for the two portions in the event of an under-voltage or surge on one of them. Thus, it is seen that in the nonlimiting embodiment illustrating the invention, the two portions 43A and 43B are supplied at the same electrical voltage. Certain elements are wired up to the first portion 43A, each via a surge protection device 434A. Certain other elements are wired up to the portion 43B, each via a surge protection device 434B.

For example, to ensure the proper operation of the pumps of the cooling circuit, one of the motors 81A is wired up to the first portion 43A via its electronic control circuit 82A. The other of the motors 81B is wired up to the second portion 43B via its electronic control circuit 82B. The electronic control circuits of the sub-system A, namely the wheel drive electronic module 23 associated with the rotary electric machine 2 of the front right wheel, the wheel drive electronic module 23 associated with the rotary electric machine 2 of the rear left wheel and the electronic dissipation module 60A of the dissipation resistor 6A are wired up to the second portion 43B while the same electronic circuits of the sub-system B are wired up to the first portion 43A.

The central unit 3 ensuring the management of the movement of the vehicle, since it controls the set of wheel drive electronic modules 23, benefits from a dual electrical wiring. It is wired up both to the first portion 43A and the second portion 43B, via a pair of diodes isolating the said first and second portions. Each connection of the central unit 3 is made via a diode 435 so as to ensure the continuity of the electrical power supply of the central unit 3, even in the event of failure of one of the 2 low-voltage sources. Furthermore, an appropriate circuit 436 monitors the presence of electrical voltage on each of the power supply lines so as to dispatch a defect signal in the event of a fault with one of the two electrical power supplies. The electronic recovery module 50 associated with the bank of super capacitors 5 is wired up to the first portion 43A alone. Note that this type of dual wiring could also be used for all the electronic circuits, in particular for the wheel drive electronic modules 23.

In the case of an under-voltage or a surge arising for example following a short-circuit on one of the two portions 43A or 43B or directly inside one of the power supplies 41 or 42, the electrical separation device 430 interrupts the connection between the two portions 43A and 43B so as to preserve the functionality of the defect-free portion. It is therefore seen that, if for any reason, a significant defect on the voltage converter 41 causes the electrical separation device 430 to interrupt the interconnection between the voltage converter 41 and the battery 42, the latter can continue to supply low-voltage to the electronic control circuits associated with the sub-system A and the central unit as well as one of the 2 pumps of the hydraulic cooling circuit. Conversely, in the case of a significant defect on the battery 42 side, the electrical separation device 430 can interrupt the interconnection and the voltage converter 41 can continue to supply the sub-system B, the central unit and one of the pumps of the hydraulic cooling circuit. It is therefore seen that the architecture described makes it possible to maintain the operation of one of the 2 sub-systems A or B and therefore half the vehicle braking power is still available. Of course, by using the dual wiring of the low-voltage electronic power supply for all the electronic circuits, it is possible to maintain, even in this case of a defect, the whole of the braking power.

The brake pedal is assumed to be sufficiently secure through its construction and is therefore not dualed. It is necessary to transform the driver's action on the brake pedal into an electrical signal utilizable by the central unit 3 and/or the wheel drive electronic modules 23. To this end, sensors associated with the brake pedal are installed. Several are installed so as to ensure a certain redundancy with a view to raising the safety of the system to a sufficient level. It is advisable for the braking system, globally, to be capable of coping with categorical sensor defects such as the disappearance of the electrical power supply of a sensor or of the signal that it delivers, as well as a short-circuit of the signal to "plus" or to "zero". Furthermore, it is also advisable for the braking system, globally, to be capable of coping with certain drifts such as a simple offset between the information delivered by one sensor with respect to the others (non-categorical sensor defect). To this end, three position sensors, C1, C2 and C3, are each associated with the brake pedal and each deliver a signal representative of the control desired by the driver of the vehicle.

The architecture of the system according to the invention has allotted a different role to the three sensors C1, C2 and C3. Let us consider that there exists a first group comprising the first sensor C1 and a second group comprising the second sensor C2 and the third sensor C3. It is possible to envisage associating two sensors on the central unit 3 and one sensor with all the wheel electronic modules 23, or else to envisage associating one sensor with the central unit 3 and two sensors with the wheel electronic modules 23. Before returning subsequently to various possibilities of associations, a preferred variant which associates two sensors with the wheel electronic modules 23 in the particular case of a four-wheel vehicle equipped with the means of the invention is described below in detail.

Let us now describe the power supply of the braking sensors C1, C2 and C3 which are at the source of the braking control chain. Recall that the system according to the invention comprises a central unit 3 which controls the set of wheel drive electronic modules 23. The sensor C1 is supplied with low-voltage electrical energy via the central unit 3. It delivers the control signal to the central unit 3 and the latter receives the braking control signal only of the sensor C1 so as to create the signals for global control of the braking of the vehicle of a first level. Let us point out that the central unit 3 comprises the appropriate circuits making it possible to monitor the presence of voltage on the power supply line of the sensor C1, as well as the integrity of the control signal on the line 30F, so as to manage information relating to a defect of the conditioning circuit for the sensor C1.

The second and third sensors are supplied with low-voltage electrical energy respectively via the wheel drive electronic module or modules (23) of one (A) of the sub-systems and via the wheel drive electronic module or modules (23) of the other (B) of the sub-systems. Of course, the second and third sensors are supplied with low-voltage electrical energy from all the wheel drive electronic modules (23) respectively of one (A) and of the other (B) of the sub-systems via diodes 230 isolating the said first and second portions. Furthermore, an appropriate circuit 231, dialoguing with each of the wheel drive modules 23, monitors the presence of electrical voltage on each of the four power supply lines, so as to dispatch a defect signal in the event of a fault with one of the four electrical power supplies. It will be seen in the next paragraph that the sensors C2 and C3 are directly associated with the wheel drive electronic modules 23 and only with the wheel drive electronic modules 23.

It has just been seen that the low-voltage electrical power supply stage comprises a first power supply and at least one second power supply, the first power supply and the second power supply being interconnected by an electrical line 43 comprising a first portion 43A and a second portion 43B, the said first and second portions being linked by an electrical separation device 430 for the two portions in the event of an under-voltage or surge on one of them. The said first sensor C1 is supplied, via the central unit 3, by each of the portions 43A and 43B. The said second sensor C2 is supplied by each of the wheel drive electronic modules 23 of one (A) of the sub-systems, through a line 232A and via diodes 230 isolating the power supplies originating from each of the wheel drive electronic modules 23. The wheel drive electronic modules 23 of the sub-system A both receive their low-voltage electrical energy from the portion 43A. The said third sensor C3 is supplied by each of the wheel drive electronic modules 23 of the other (B) of the sub-systems, through a line 232B and via diodes 230 isolating the power supplies originating from each of the wheel drive electronic modules 23. The wheel drive electronic modules 23 of the sub-system B both receive their low-voltage electrical energy from the other portion 43B.

Figure 4A:
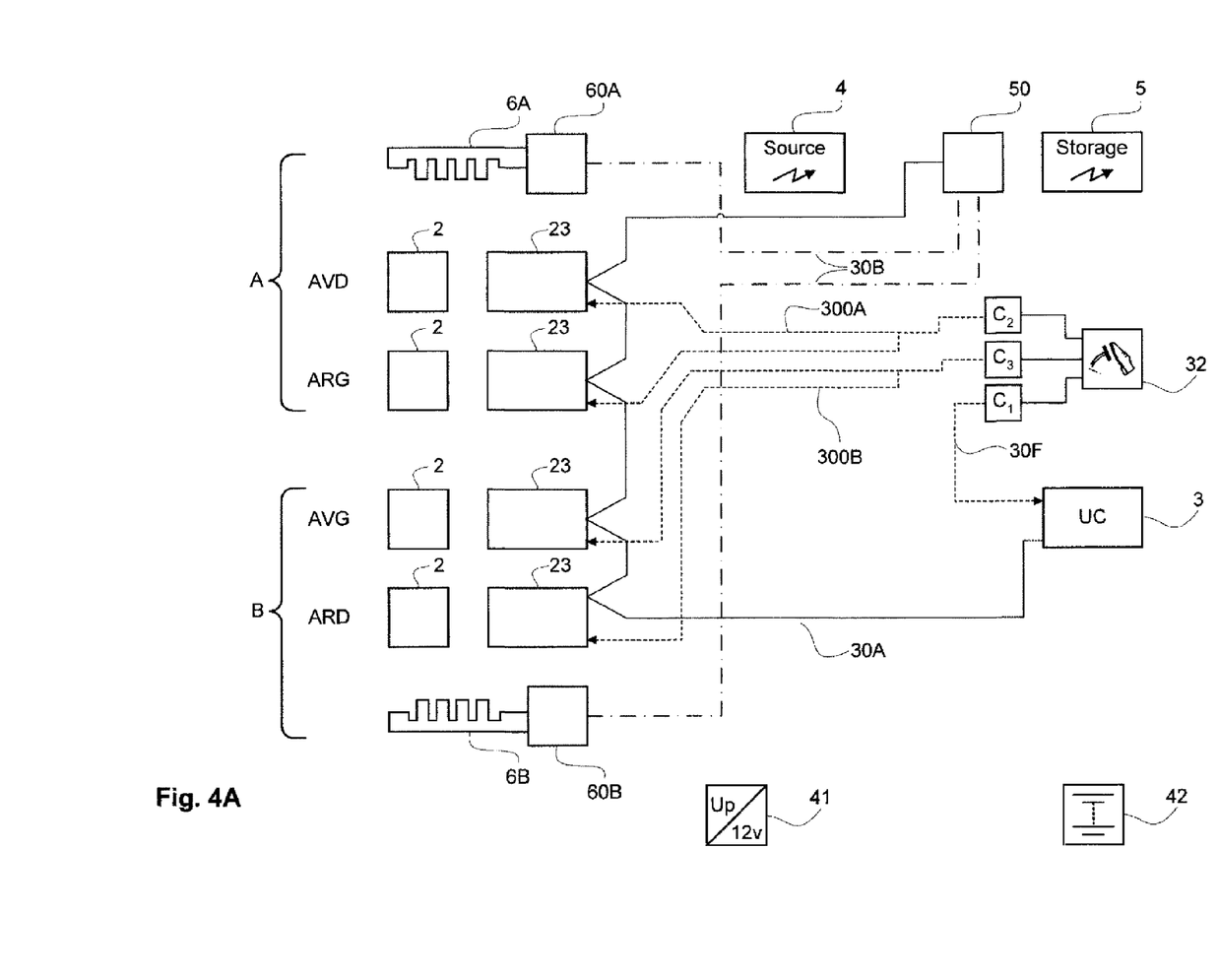
FIG. 4A details the level of the control lines between the electronic control circuits of the various elements and the central unit.

In FIG. 4A, it is seen that the central unit 3 is interconnected with each of the wheel drive electronic modules 23 and with the electronic recovery module 50 by a CAN® bus (Control Area Network, denoted by the reference 30A) allowing the transfer of drive orders in computer-based form. The central unit 3 is loaded with appropriate software so as to be able to take into account all the desirable parameters for formulating a braking control signal which is dispatched to the various electronic circuits driving the electric machines according to the protocols desired to circulate on the CAN® bus 30A. The central unit 3 dispatches the said signal in a regulated manner on the bus 30A with a periodicity of the order of 10 to 20 ms and each wheel drive electronic module 23 controls this periodicity. Each wheel drive electronic module 23 thus reacts to the orders formulated by the central unit 3 on the basis of the signal delivered by the first sensor C1. If, on account of a malfunction of the CAN Bus®, of the central unit 3 or of the installed software, or on any other account, this periodicity is not complied with, a CAN® communication defect information cue is generated in the wheel drive electronic modules 23.

Each of the wheel drive electronic modules 23 of the sub-system A, respectively of the sub-system B, furthermore directly receives analogue signals delivered by the sensor C2, respectively C3, this time via analogue lines 300A, respectively 300B. Let us also point out that each wheel drive module 23 comprises the appropriate circuits making it possible to monitor the integrity of the control signal on the lines 300A and 300B, so as to manage a defect information cue in the event of a fault with the conditioning circuit for the sensor C2, respectively C3.

Each wheel drive electronic module 23 monitors its sensor signal (detection of categorical defect) and generates in an autonomous manner a "valid sensor measurement" cue. In addition to the braking control formulated on the basis of the sensor C1, the central unit signals on CAN® bus 30A if its own sensor C1 is valid to each wheel drive electronic module 23. If this is not the case, each wheel drive electronic module 23 ignores the braking setpoint circulating on CAN® bus 30A to apply the setpoint of the sensor which is associated therewith, namely the setpoint originating from the sensor C2 or the sensor C3. Each wheel drive electronic module 23 also applies the setpoint of the sensor which is associated therewith, namely the setpoint originating from the sensor C2 or the sensor C3, in the event of detecting a communication defect signalled on CAN® as explained above. In the event of detecting a categorical fault on the sensor C2 or on the sensor C3, the full braking capability is preserved; the same holds even in the event of a categorical fault at one and the same time on the sensor C2 and on the sensor C3 as long as there exists a braking control signal formulated on the basis of the sensor C1 signalled valid on CAN® bus 30A. However, even if the full braking capability is preserved in the event of detecting a categorical fault on the sensor C2 and/or on the sensor C3, it is appropriate to activate an alert to inform the driver of the vehicle of a failure in the redundancy and to program various appropriate measures such as for example forbidding the subsequent restarting of the vehicle or limiting its speed.

Figure 4B:
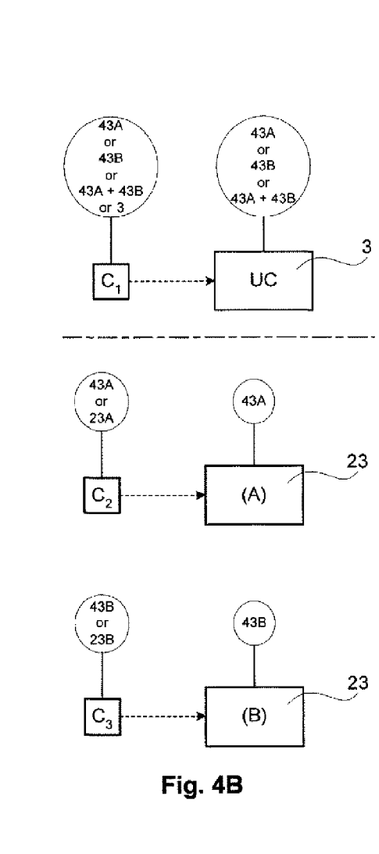
FIG. 4B illustrates a few variant embodiments of the configuration illustrated in FIG. 4A.

FIG. 4B shows diagrammatically that, in the configuration which has just been described with the support of FIGS. 3 and 4, the sensor C1 can be supplied by the central unit 3 (as shown in FIG. 3) or else directly by the portions 43A and 43B (with interposition of diodes) or, as an acceptable variant, either by the portion 43A or the portion 43B. The sensor C2 can be supplied from at least one of the electronic wheel modules 23 of the sub-system A (FIG. 3 shows a dual power supply of this type) or directly by the portion 43A and the sensor C3 can be supplied from at least one of the electronic wheel modules 23 of the sub-system B (FIG. 3 shows a dual power supply of this type) or directly by the portion 43B. Thus, in the event of a fault with the power supply on the portion 43A for example, the sensor C3 and the electronic wheel modules 23 which are associated therewith (those of the sub-system B) remain supplied and can play their role explained elsewhere.

It is possible to design other embodiments of the low-voltage power supplies and of the sensor wirings associated therewith. It is however important to take good care that, in the event of a fault with one of the low-voltage sources, at one and the same time the sensor or sensors and the associated electronic wheel module or modules 23 are still all supplied. The redundancy objective to improve safety would not be complied with if, for example, a sensor were supplied only through the voltage present on the first portion 43A and one of the wheel drive electronic modules 23 associated with this sensor were supplied only through the second portion 43B and vice versa.

Finally, control lines 30B link the electronic recovery module 50 to the electronic dissipation modules 60A and 60B. In the event of a defect on the said control lines 30B or on the electronic recovery module 50, the electronic dissipation modules 60A and 60B preserve the possibility of dissipating the braking power which goes back up on the power line 40 in an autonomous manner, without receiving any command on the line 30B. The principle of the subassemblies A and B therefore remains fully operational for braking but without any possibility of storing the energy since under the latter hypothesis, the electronic recovery module 50 is out of service.

Let us return to the creation of the braking torques by the electric machines 2. The driving of the electric machines 2 being ensured directly by a wheel drive electronic module 23 particular to each of the electric machines 2. The latter is loaded with the appropriate software for driving each electric machine in terms of torque according to the control signals received. Each wheel drive electronic module 23 receives braking control signals on the one hand on the bus 30A and on the other hand on the analogue line 300 delivering the signal of the sensor C2 or C3. Each wheel drive electronic module 23 can therefore compare at any moment the control signal delivered on the bus 30A and the control signal delivered by the analogue line 300 and, within a certain tolerance margin for example of the order of 10 to 20% according to experimental determinations, give priority to the braking control signal originating from the bus 30A. This is the normal operating mode.

On the other hand, if on account of a malfunction of the central unit 3 or of the software installed in the central unit 3, the braking control signal dispatched by the bus 30A was much less than the braking control signal originating directly in an analogue manner from the sensor C2, or C3, priority can be given to the control signal originating from the sensor C2 (respectively C3) to ensure the braking operational safety of the vehicle.

With three sensors, the system is even capable of reacting faced with "non-categorical" defects. The detection of any offset between sensors is centralized at the level of the central unit 3 which has its own measurement and the measurement circulating on CAN bus 30A of all the wheel drive electronic modules 23. The central unit 3 ensures a consistency check of the measurements by determining by a "majority vote" which are the valid measurements. In addition to the braking control formulated on the basis of the sensor C1, the central unit 3 signals to each wheel drive electronic module 23, by appropriate signal on the CAN bus 30A, if its own sensor C1 is valid. It signals moreover if the inherent measurement of each wheel drive electronic module 23 is itself valid (the latter not undertaking, in an autonomous manner, this consistency check). If the measurement of the sensor C1 directly associated with the central unit 3 is not valid, each wheel drive electronic module 23 ignores the braking setpoint circulating on the CAN bus 30A to apply the setpoint (analogue signal) of its own sensor C2 or C3, if the latter is valid. If the internal setpoint of the wheel drive electronic module 23 is not valid (the probability that this arises at the same time for both sensors being considered low) then the wheel concerned does not brake.

Note that only the sensor C1 (first group) is connected to the central unit 3; it serves, alone, for the calculation of the braking setpoint in the normal situation. The second group (sensors C2 and C3) is connected to the wheel drive electronic modules 23 which transmit on the CAN® bus 30A their measurements arising from the sensors C2 and C3 to the central unit 3. Let us stress that the first group of sensors (here, the sensor C1 alone) is connected physically to the central unit 3. It delivers an analogue signal to the central unit 3. Let us further stress that the sensor (sensors) of the second group (here, the sensors C2 and C3) deliver an analogue signal to each of the wheel drive electronic modules 23 and that, downstream and via the wheel drive electronic modules 23, they deliver to the central unit 3, this time indirectly, a cue via a communication pathway of computer-based type. Digital, rather than analogue, signals circulate on this communication pathway of computer-based type. The measurements of the second group of sensors (sensors C2 and C3) participate, in the central unit 3, in the consistency check, as explained above, so as to validate the set of measurements. They do not intervene on the other hand directly in the normal calculation of the braking setpoint.

It is known that hardware multiplication helps, in the case of a judicious implementation, to increase the operational safety of a system. This is the principle of redundancy. However, the more the amount of hardware installed is increased, the more the probability of a fault is increased. For example, if to ensure the redundancy of information at the level of the central unit 3, the set of sensors is connected to this unit, the multiplication of the physical electrical lines between sensors and central unit increases the risk of a fault. Now, observing that, in the braking system dealt with here, the wheel drive electronic modules 23 anyway receive as input an information cue originating from sensors and that, in the state of the art, a communication pathway of computer-based type, that is to say for example a CAN® bus, is installed anyway to ensure the dialogue between all the sub-systems, by virtue of the invention, an analogue/digital conversion pathway already existing in the wheel drive electronic modules is used and one or more additional information cues (the information originating from the sensors of the second group) is or are circulated on the likewise already existing CAN bus so as to impart a redundancy at the level of the central unit 3. This done, a redundancy is ensured without adding hardware for this purpose alone, therefore without running the risk of degrading the reliability of the system. In this way, it is possible to reconcile high operational safety by virtue of a redundancy originating from the utilization of several sensors, and high reliability by containing the hardware used (in particular the physical electrical connections) to the strict minimum.

It is possible to further increase safety for example by using for example 4 sensors in the second group, a sensor being associated with a single wheel. The considerations given above in the event of detecting a categorical fault on the sensor C2 or on the sensor C3 (full braking capability preserved by virtue of the pathway using the sensor C1, utility of alerts, or indeed of appropriate precautionary measures) applies of course to an embodiment with four sensors in the second group.

It is seen that the proposed architecture effects a different utilization of the signals delivered by each of the sensors C1 on the one hand and C2 and C3 on the other hand. The sensor C1 is associated with the central unit 3 and makes it possible to calculate a first-level global braking signal. Moreover, the control signals delivered by the sensors C2 and C3 are directly delivered by analogue pathway by appropriate lines to the wheel drive electronic modules 23

If a wheel drive electronic module 23 detects a communication defect on the CAN bus 30A, or if the central unit 3 detects a defect of the sensor C1 or of its conditioning circuit, priority can be given to the control signal originating from the sensor C2, respectively C3. In this way, the safety in the control of the braking is ensured even in the event of failure of the bus 30A, or of a portion of the bus, or of any one of the analogue lines 300 or 30F. Of course, as already mentioned above under another hypothesis, it is appropriate to activate an alert to inform the driver of the vehicle of a failure in the redundancy and to program various appropriate measures such as for example to forbid the subsequent restarting of the vehicle or limit its speed.

In addition to all this, it is possible to allow for a possibility of creating a predetermined braking signal by an emergency control by means for example of an emergency button at the disposal of the driver. This type of braking control is taken into account by the central unit 3, more precisely by the software installed in the central unit 3, and is trunked to the electronic control modules 23 of each of the electric machines by the CAN bus 30A. This can ensure operational safety on braking even in the event of the brake pedal breaking. Likewise, this can ensure operational safety on braking in the event that three sensors break or that the fixing of the three brake sensors C1, C2 and C3 breaks. If only the mechanical link of one of the three sensors C1 or C2 or C3 or one of the sensors fails, of course braking operational safety is ensured as explained in the previous paragraph. But in this case, it is for example possible to authorize the end of the journey and, after stoppage of the vehicle, forbid its restarting.

Figure 5:
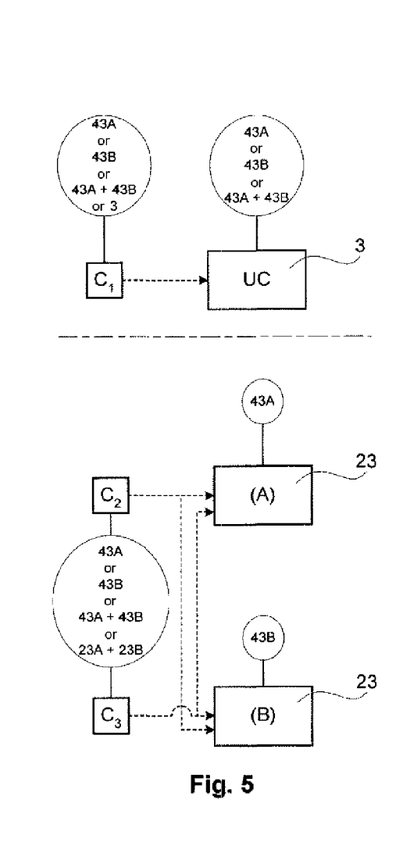
FIG. 5 illustrates a second embodiment of the low-voltage electrical power supply level and of the level of the control lines which is associated therewith.

FIG. 5 illustrates another embodiment of the sensor associations and of the low-voltage power supplies. The first group comprises a first sensor C1 connected directly or indirectly to one or the other of the first or second power supplies or to both, the second group comprising a second sensor C2 and a third sensor C3. Each of the second and third sensors C2 and C3 is associated, so as to deliver a control signal to the wheel drive electronic module (modules) 23 of the two subsystems A and B, the second sensor (C2) and the third sensor (C3) being connected directly or indirectly to one of the first or second power supplies or both.

In a variant embodiment, if the sensor C1 is connected directly or indirectly to a single of the first or second power supplies, for example the portion 43A, then at least one of the second C2 or third C3 sensors must be supplied by a different power supply from that of the first sensor C1, for example the portion 43B.

Figure 6:
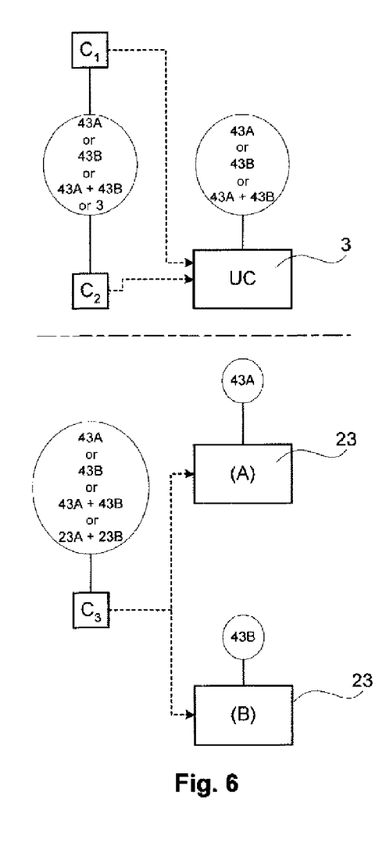
FIG. 6 illustrates a third embodiment of the low-voltage electrical power supply level and of the level of the control lines which is associated therewith.

FIG. 6 illustrates a third embodiment of the sensor associations and of the low-voltage power supplies. This time, the first group comprises a first sensor C1 and a second sensor C2 connected directly or indirectly to one of the first or second power supplies or both, the second group comprising a third sensor C3 associated so as to deliver a control signal to the wheel drive electronic module (modules) 23 of the two subsystems A and B, the third sensor C3 being supplied by one of the first or second power supplies or by both.

In this embodiment, the sensors C1 and C2 (first group) are connected physically to the central unit 3 and deliver an analogue signal to it, while the sensor C3 (second group) is connected to the wheel drive electronic modules 23 which transmit on the CAN® bus 30A the measurement arising from the sensor C3 the central unit 3. This therefore involves an indirect transmission via the wheel drive electronic modules 23, of an information cue via a communication pathway of computer-based type.

If as a variant of the third embodiment, the central unit 3 is supplied by a single of the first or second power supplies, for example by connection to the portion 43A, and if the three sensors C1, C2 and C3 are also supplied by a single of the first or second power supplies, then at least one of the sensors C1 or C2 of the first group must be supplied by the same power supply as that of the central unit 3 while the sensor C3 of the second group must be supplied by a different power supply from that of the central unit 3, in this case by connection to the portion 43B.

Finally, let us point out that preferably the hardware redundancy which has just been set forth is used in combination with a software redundancy, advantageously at one and the same time for the software loaded into the central unit 3 and that loaded into the wheel drive electronic modules 23. In this way, a high degree of safety of the vehicle braking system is achieved totally electrically.

The invention claimed is:

1. A system for electrical braking of a road vehicle including four wheels, each of the wheels being linked in rotation to a distinct rotary electric machine driven by a distinct wheel drive electronic module, the system comprising:

a central unit, which manages movement of the vehicle, the central unit controlling the wheel drive electronic modules; and a braking control unit operable by a driver, the braking control unit being linked mechanically to sensors delivering control signals for braking the vehicle, the control signals having a given amplitude representative of a total braking force desired for the vehicle, the sensors being distributed into a first group and a second group, in which a sensor of the first group is connected physically to the central unit and delivers an analogue control signal directly to the central unit without using any of the plurality of wheel drive electronic modules, and in which a sensor of the second group delivers an analogue control signal to each of the plurality of wheel drive electronic modules, the plurality of wheel drive electronic modules delivering information originating from the sensor of the second group to the central unit via a computer-based type of communication pathway, wherein the sensor of the second group is connected to the central unit through at least one of the wheel drive electronic modules.

2. A system according to claim 1, further comprising:

a subsystem A and a subsystem B, each of the subsystems A and B including a subset of the wheel drive electronic modules; and a low-voltage electrical power supply stage for supplying electronic command and control circuits for power elements, wherein the low-voltage electrical power supply stage includes a first power supply and a second power supply, the first and second power supplies are interconnected by an electrical line that includes a first portion and a second portion, the first and second portions being linked by an electrical separation device capable of interrupting an interconnection, in an event of an under-voltage or a surge on one of the first and second portions, the subsystems A and B are supplied by the first and second portions, respectively, the first group includes a first sensor connected directly or indirectly to one or both of the first and second power supplies, and the second group includes a second sensor and a third sensor, the second sensor and the wheel drive electronic module or modules of the subsystem A being connected directly or indirectly to the first power supply, the second sensor delivering the analogue control signal to the wheel drive electronic module or modules of the subsystem A, the third sensor and the wheel drive electronic module or modules of the subsystem B being connected directly or indirectly to the second power supply, the third sensor delivering the analogue control signal to the wheel drive electronic module or modules of the subsystem B.

3. A system according to claim 1, further comprising:
subsystem A and subsystem B, each of the subsystems A and B including a subset of the wheel drive electronic modules; and
a low-voltage electrical power supply stage for supplying electronic command and control circuits for power elements, wherein
the low-voltage electrical power supply stage includes a first power supply and a second power supply, the first and second power supplies being interconnected by an electrical line that includes a first portion and a second portion linked by an electrical separation device capable of interrupting an interconnection, in an event of an under-voltage or a surge on one of the first and second portions,
the subsystems A and B are supplied by the first and second portions, respectively,
the first group includes a first sensor connected directly or indirectly to one or both of the first and second power supplies, and
the second group includes a second sensor and a third sensor, each of the second and third sensors delivering the analogue control signal to the wheel drive electronic modules of the subsystems A and B, the second sensor and the third sensor being connected directly or indirectly to one or both of the first and second power supplies.

4. A system according to claim 3, wherein the first sensor of the first group is connected directly or indirectly to one of the first and second power supplies, and wherein at least one of the second and third sensors is supplied by a different power supply from that of the first sensor.

5. A system according to claim 1, further comprising:
subsystems A and B, each of the subsystems A and B including a subset of the wheel drive electronic modules; and
a low-voltage electrical power supply stage for supplying electronic command and control circuits for power elements, wherein
the low-voltage electrical power supply stage includes a first power supply and a second power supply, the first and second power supplies being interconnected by an electrical line that includes a first portion and a second portion, the first and second portions being linked by an electrical separation device capable of interrupting an interconnection, in an event of an under-voltage or a surge on one of the first and second portions,
the subsystems A and B are supplied by the first and second portions, respectively,
the first group includes a first sensor and a second sensor connected directly or indirectly to one or both of the first and second power supplies, and
the second group includes a third associated sensor for delivering the analogue control signal to the wheel drive electronic modules of the subsystems A and B, the wheel drive electronic modules of the subsystems A and B being connected directly or indirectly to one or both of the first and second power supplies.

6. A system according to claim 5, wherein
the central unit is supplied by one of the first and second power supplies,
the first, second, and third sensors are supplied by one of the first or second power supplies,
a sensor of the first group is supplied by a same power supply as that of the central unit, and
a sensor of the second group is supplied by a different power supply from that of the central unit.

7. A system according to one of claims 2, 3, and 5, wherein the first sensor is supplied with low-voltage electrical energy via the central unit.

8. A system according to one of claims 2, 3, and 5, wherein the first power supply is a battery.

9. A system according to one of claims 2, 3, and 5, further comprising a central electrical line, wherein the second power supply includes a voltage converter wired to the central electrical line.

10. A system according to one of claims 2, 3, and 5, wherein the vehicle is a four-wheel vehicle, each wheel being linked in rotation to at least one rotary electric machine specific to that wheel, and wherein each of the subsystems A and B corresponds to two of the four wheels, respectively.

11. A system according to one of claims 2, 3, and 5, wherein each of the subsystems A and B groups together wheels disposed diagonally at opposite corners of the vehicle, respectively.

12. A system according to one of claims 2, 3, and 5, wherein the central unit is supplied simultaneously by the first and second portions via a pair of diodes isolating the first and second portions.

13. A system according to one of claims 2, 3, and 5, wherein the central unit includes a program ensuring a measurements consistency check based on a determination of valid measurements.

* * * * *